No. 684,271. Patented Oct. 8, 1901.
A. KUEN.
FEEDER FOR THRESHING MACHINES.
(Application filed Mar. 18, 1901.)
(No Model.)
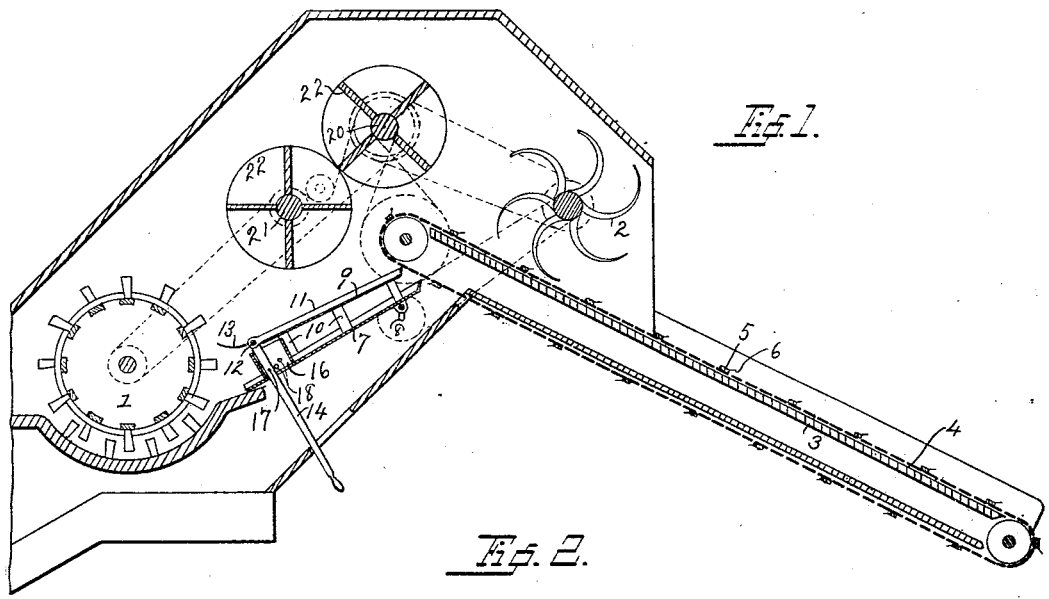
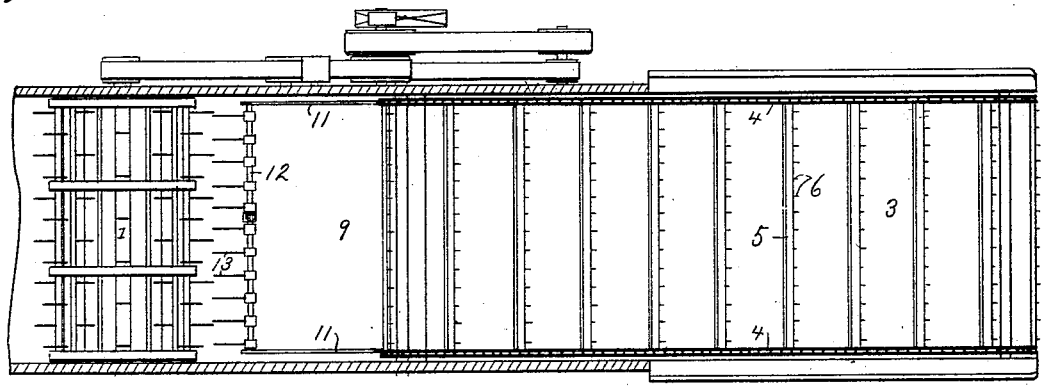
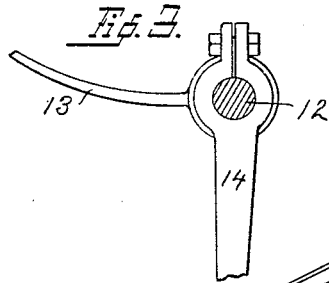
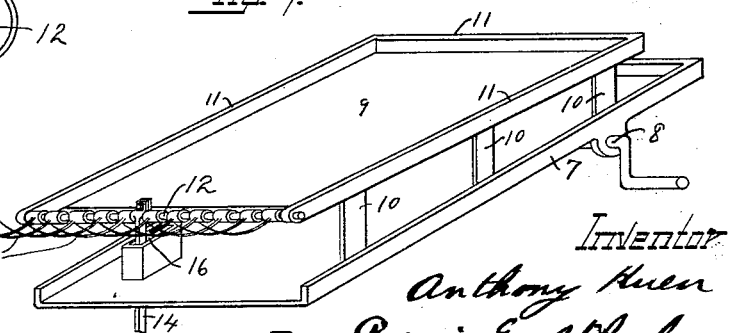
Witnesses:
Inventor
Anthony Kuen

UNITED STATES PATENT OFFICE.

ANTHONY KUEN, OF BROWNSVILLE, WISCONSIN, ASSIGNOR OF ONE-HALF TO ALBERT STERR, OF LEROY, WISCONSIN.

FEEDER FOR THRESHING-MACHINES.

SPECIFICATION forming part of Letters Patent No. 684,271, dated October 8, 1901.

Application filed March 18, 1901. Serial No. 51,802. (No model.)

*To all whom it may concern:*

Be it known that I, ANTHONY KUEN, a citizen of the United States, residing at Brownsville, county of Dodge, State of Wisconsin, have invented new and useful Improvements in Feeders for Threshing-Machines, of which the following is a specification.

My invention relates to improvements in feeders for threshing-machines, and pertains especially to the peculiar arrangement of a set of beaters in combination with a delivery-slide, chaff-pan, and feed-regulator of novel and peculiar construction, as hereinafter set forth.

The objects of my invention are to secure an effective longitudinal distribution of the straw and to regulate the feed thereof to the cylinder and also to provide a form of shaking-pan in which the straw and chaff will not be blown backwardly by air currents or eddies from the cylinder and beaters.

In the following description reference is had to the accompanying drawings, in which—

Figure 1 is a sectional view of my invention. Fig. 2 is a top view of the conveyer and delivery-slide. Fig. 3 is a detail view of a portion of the feed-regulating fork and its adjusting-lever, and Fig. 4 is a perspective view of the shaking-pan and fork.

Like parts are identified by the same reference characters throughout the several views.

1 is the cylinder of the threshing-machine.

2 is a rotary band-cutter adapted to cut the bands of the bundles placed upon an inclined conveyer, of which 3 is the frame, 4 the longitudinal belts or chains, 5 the cross-slats, and 6 the spines, these parts being of ordinary construction.

7 is a shaking chaff-pan supported on a crank-shaft 8, with its rear or lower end resting on the feed-board of the threshing-machine and its forward or upper end extending into close proximity to the conveyer on its return side and a little in advance of the rear or upper end of the conveyer. A feed-slide 9 is supported from the pan 7 by posts 10. This is similar in construction to the pan 7, but somewhat shorter longitudinally, and both the pan and slide are provided with raised flanges 11 at their sides and upper or forward edges. The front posts 10 are preferably shorter than those in the rear, thus causing the pans to diverge slightly in the direction of the cylinder. At the lower end of the feed-slide 9 I have provided a feed-regulating fork consisting of the cross-rod 12 and curved tines or detaining-fingers 13. A lever 14 is rigidly secured to the rod and projects downwardly through a channeled opening or slot 16 in and between the pans, whereby the fork may be adjusted with the tines at any desired angle. The tines are lowered for dry straw and raised for wet straw, it being necessary to feed the latter more slowly. The lever may be conveniently held in any desired position of adjustment by a pin 17, adapted to fit in a hole in the lever and in any one of a series of holes 18 in the side flange of the lower pan.

For distributing the straw I have provided a set of beaters mounted on shafts 20 and 21, respectively, and provided with beater-wings 22, the shafts and wings extending transversely of the feedway, with the shaft 20 approximately over the discharge end of the spined conveyer, and the shaft 21 is located in the rear thereof in a lower plane and above the shaker-pan. The latter shaft is revolved at a higher speed than the former, as indicated by the belt-and-pulley connections, (shown by dotted lines in Fig. 1,) and the shafts of the beaters are located in such proximity that their respective beater-wings will nearly contact with each other when both are in the plane of the shafts. In other words, the circles of revolution of the two beaters will approximately contact in the plane of the shafts.

In operation the bands of bundles carried by the conveyer are severed by the band-cutter and distributed longitudinally by the two beaters, while the fork at the lower ends of the upper shaking or delivery pan 9 retains the straw if in excessive quantities. The cylinder-teeth strip straw from the fork as rapidly as they are able to receive it. The upper pan prevents the air-currents from striking the lower or chaff pan, and the upwardly-projecting flange at the forward end of the upper pan 9 deflects the air-currents passing between such pan to the conveyer in such a manner that the chaff will drop and be caught by the longer lower pan.

It will be observed that the surfaces of the respective pans—viz., the feed-slide 9 and the chaff-pan 7—are smooth and the pans are inclined sufficiently, so that the straw and chaff will slide downwardly to the cylinder, especially when the pans are vibrated by means of the crank-shaft 8. The tines 13 of the fork are curved upwardly and are relied upon entirely to regulate the delivery of the straw from the pans to the cylinder. As the pans have such a downward pitch that the straw will slide freely thereon to the rear or cylinder end and as the forks serve to regulate the feed, I am enabled to dispense with all zigzag projections on the pans themselves, such as are commonly employed for the purpose of advancing the straw. It will also be observed that the space between the two pans is left open and unobstructed at the sides, except by the posts 10. The object of this is to permit the air to freely escape from between the pans, for while the upper pan receives most of the air-blast from the cylinder, yet sufficient air is driven between the pans to carry the chaff forwardly and upwardly if the sides are inclosed, while if they are left open the relatively small quantity of air which is driven between the pans will be permitted to escape without carrying the chaff with it.

Having thus described my invention, what I claim as new, and desire to secure by Letters Patent, is—

1. In a device of the described class, the combination with a bundle-conveyer, band-cutter, and distributing devices; of a downwardly and rearwardly inclined chaff-pan, interposed between the rear end of the conveyer and the threshing-cylinder, and projecting underneath the rear end of the conveyer; means for longitudinally oscillating said pan; a feed-slide rigidly connected with said pan, and diverging therefrom with an intervening space for the passage of chaff, said feed-slide having sufficient inclination to permit the straw to slide freely in the direction of the cylinder; together with an adjustable feed-regulating fork mounted on the lower end of the feed-slide, and provided with upwardly-curving tines.

2. In a device of the described class, the combination with a bundle-conveyer, band-cutter and distributing devices; of a downwardly and rearwardly inclined chaff-pan interposed between the rear end of the conveyer and the cylinder of the threshing-machine, and projecting underneath the rear end of the conveyer; means for oscillating said pan; a feed-slide of shorter length, mounted on said pan, and supported therefrom, with an intervening space between the pan and slide; an adjustable feed-regulating fork mounted on the lower end of the feed-slide, said feed-slide and pan being smooth-surfaced, and having sufficient inclination to permit the chaff and straw to slide freely in the direction of the cylinder.

In testimony whereof I affix my signature in the presence of two witnesses.

ANTHONY KUEN.

Witnesses:
GEORGE A. SPIEGELBERG,
GUSTAV R. ROUSSEAU.